United States Patent
Yokozutsumi et al.

(10) Patent No.: US 9,385,630 B2
(45) Date of Patent: Jul. 5, 2016

(54) POWER CONVERSION CONTROL DEVICE, POWER CONVERSION CONTROL METHOD, ELECTRIC MOTOR, AND VEHICLE DRIVING SYSTEM

(75) Inventors: Ryo Yokozutsumi, Tokyo (JP); Yuruki Okada, Tokyo (JP); Hisanori Yamasaki, Tokyo (JP); Sho Kato, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 203 days.

(21) Appl. No.: 14/347,658

(22) PCT Filed: Sep. 30, 2011

(86) PCT No.: PCT/JP2011/072645
§ 371 (c)(1),
(2), (4) Date: Mar. 27, 2014

(87) PCT Pub. No.: WO2013/046462
PCT Pub. Date: Apr. 4, 2013

(65) Prior Publication Data
US 2014/0232318 A1    Aug. 21, 2014

(51) Int. Cl.
G05B 11/28    (2006.01)
H02M 7/5387    (2007.01)
H02P 27/08    (2006.01)

(52) U.S. Cl.
CPC ............. *H02M 7/5387* (2013.01); *H02P 27/08* (2013.01); *H02P 27/085* (2013.01)

(58) Field of Classification Search
CPC .......... H02P 27/08; H02P 25/04; H02M 7/48; H02M 7/53875
USPC .................................. 318/599, 811, 800, 801
See application file for complete search history.

(56) References Cited

U.S. PATENT DOCUMENTS

| 4,490,606 | A | * | 12/1984 | Lockett | ................. | G01D 5/268 250/227.21 |
|---|---|---|---|---|---|---|
| 5,680,299 | A | | 10/1997 | Yasuda et al. | | |

(Continued)

FOREIGN PATENT DOCUMENTS

| EP | 0808016 A1 | 11/1997 |
|---|---|---|
| JP | 3455788 B2 | 10/2003 |

(Continued)

OTHER PUBLICATIONS

International Search Report (PCT/ISA/210) mailed on Jan. 10, 2012, by the Japanese Patent Office as the International Searching Authority for International Application No. PCT/JP2011/072645.

(Continued)

*Primary Examiner* — Rina Duda
(74) *Attorney, Agent, or Firm* — Buchanan Ingersoll & Rooney PC

(57) ABSTRACT

A power conversion control device includes a modulation-wave generating unit generating a modulation wave based on output voltage phase angle command and modulation factor, a carrier-wave generating unit that, in a case of non-overmodulation state, generates a triangular wave or saw-tooth wave as the carrier wave, and, in a case of overmodulation state, generates, as the carrier wave, a signal fixed to −1 in a first section that is a predetermined range centering on timing corresponding to a peak position of the modulation wave, generates, as the carrier wave, a signal fixed to +1 in a second section obtained by shifting the first section by a half cycle of the modulation wave, and generates, as the carrier wave, a triangular wave or saw-tooth wave in remaining third section, and a comparing unit that compares the carrier wave and the modulation wave and generates a switching signal.

11 Claims, 9 Drawing Sheets

(56) References Cited

U.S. PATENT DOCUMENTS

| | | | |
|---|---|---|---|
| 7,499,290 B1* | 3/2009 | Mazzola | H02M 3/33569 363/17 |
| 2010/0020581 A1* | 1/2010 | Mazzola | H02M 3/33569 363/132 |
| 2010/0250067 A1 | 9/2010 | Matsumura et al. | |

FOREIGN PATENT DOCUMENTS

| | | |
|---|---|---|
| JP | 2005-318755 A | 11/2005 |
| JP | 2007-110811 A | 4/2007 |
| JP | 2010-221856 A | 10/2010 |
| WO | WO 2011/065406 A1 | 6/2011 |
| WO | 2014174697 A1 | 10/2014 |

OTHER PUBLICATIONS

Written Opinion (PCT/ISA/237) mailed on Jan. 10, 2012, by the Japanese Patent Office as the International Searching Authority for International Application No. PCT/JP2011/072645.

International Search Report (PCT/JP2011/072645) mailed Oct. 29, 2015 in corresponding European Patent Application No. 11873497.9 (7 pages).

D. Grant et al., "Technique for Pulse Elimination in Pulsewidth-Modulation Inverters with no Waveform Discontinuity", IEE Proceedings B (Electric Power Applications), vol. 129, No. 4, Jul. 4, 1982, pp. 205-210.

Korean Office Action with English Translation mailed Nov. 13, 2015 in corresponding Korean Patent Application No. 10-2014-7010870 (10 pages).

* cited by examiner

POWER CONVERSION CONTROL DEVICE, POWER CONVERSION CONTROL METHOD, ELECTRIC MOTOR, AND VEHICLE DRIVING SYSTEM

FIELD

The present invention relates to a power conversion control device for controlling a power conversion device that drives a three-phase alternating-current electric motor and the like.

BACKGROUND

There is Patent Literature 1 as a literature in which power conversion control in the past is described. Patent Literature 1 explains a technology for solving various problems that occur when a control mode of an inverter is switched, specifically, a problem in which a switching frequency becomes discontinuous and a tone change of magnetic noise caused due to the discontinuous switching frequency is harsh on the ears and a problem in which fluctuation occurs in generated torque of an electric motor. According to the technology described in Patent Literature 1, it is also possible to solve a problem in which the number of generated pulses becomes unstable in a section where crossing of a carrier wave and a modulation wave frequently occurs (near a zero-cross of the modulation wave) in an operation in an overmodulation state, in which the modulation factor exceeds 100%, and an asynchronous PWM mode (a state in which the modulation wave and the carrier wave are not synchronous with each other).

CITATION LIST

Patent Literature

Patent Literature 1: Japanese Patent No. 3455788

SUMMARY

Technical Problem

In the case of the overmodulation state, there is a section where the crossing of the modulation wave and the carrier wave does not occur and extremely narrow pulses are generated near the section. The influence of the extremely narrow pulses on an output voltage of an inverter is small. Even if the pulses are absent, the output voltage hardly changes. On the other hand, the number of times of switching of a switching element configuring the inverter depends on only the number of pulses. Therefore, when pulses hardly affecting the inverter output (the extremely narrow pulses) are present, there is a problem in that a switching loss unnecessarily increases.

The present invention has been devised in view of the above and it is an object of the present invention to obtain a power conversion control device, a power conversion control method, an electric motor, and a vehicle driving system capable of reducing a switching loss related to a power converting operation.

Solution to Problem

In order to solve the above problems and achieve the object, the present invention is a power conversion control device that controls, based on a modulation wave and a carrier wave, a power conversion device that converts direct-current power into alternating-current power, including a modulation-wave generating unit that generates a modulation wave based on an output voltage phase angle command and a modulation factor calculated based on an output voltage command and a direct-current voltage supplied to the power conversion device; a carrier-wave generating unit that, in a case of a non-overmodulation state, generates a triangular wave or a saw-tooth wave as the carrier wave, and, in a case of an overmodulation state, generates, as the carrier wave, a signal fixed to −1 in a first section that is a predetermined range centering on a timing corresponding to a peak position of the modulation wave, generates, as the carrier wave, a signal fixed to +1 in a second section obtained by shifting the first section by a half cycle of the modulation wave, and generates, as the carrier wave, a triangular wave or a saw-tooth wave in a remaining third section; and a switching-signal generating unit that compares the carrier wave and the modulation wave and generates a switching signal for controlling the power conversion device.

Advantageous Effects of Invention

According to the present invention, it is possible to prevent a narrow pulse from being included in a switching signal and suppress the number of times of switching in a power conversion device. That is, there is an effect that it is possible to realize a power conversion control device capable of performing control for reducing a switching loss while preventing a modulation accuracy from being deteriorated.

DESCRIPTION OF EMBODIMENTS

Embodiments of a power conversion control device, a power conversion control method, an electric motor, and a vehicle driving system according to the present invention are explained in detail below based on the drawings. Note that the present invention is not limited by the embodiments.

First Embodiment

Figure 1:
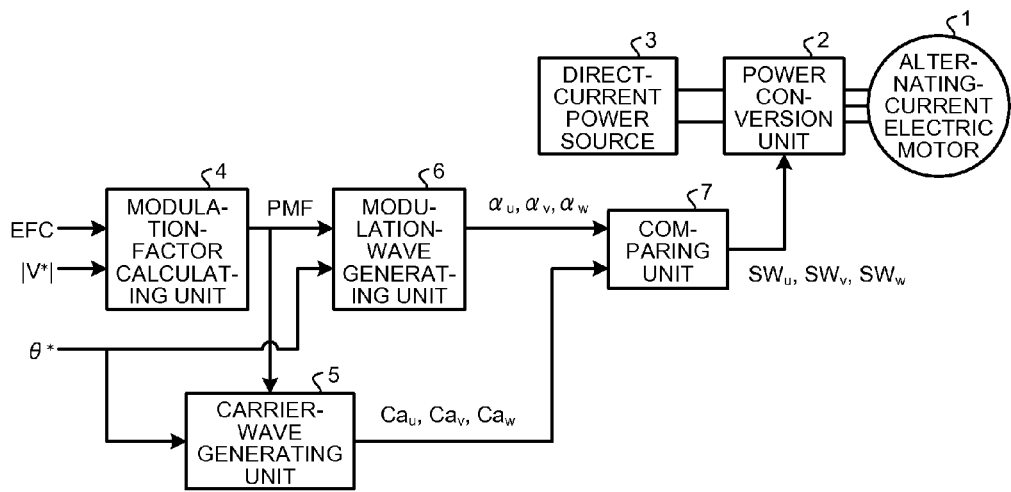
FIG. 1 is a diagram of a configuration example of a power conversion control device according to the present invention.

FIG. 1 is a diagram of a configuration example of a power conversion control device according to the present invention. FIG. 1 shows, as an example, a power conversion control device of a form for controlling a power conversion unit 2 that supplies three-phase alternating-current power to an alternating-current electric motor 1. Note that the power conversion unit 2 includes a plurality of switching elements. The power conversion unit 2 is a power conversion device that controls the switching elements according to an instruction (a switching signal) received from the power conversion control device having a below-mentioned configuration to thereby convert direct-current power supplied from a direct-current power source 3 into three-phase alternating-current power.

As shown in FIG. 1, the power conversion control device in the present embodiment includes a modulation-factor calculating unit 4, a carrier-wave generating unit 5, a modulation-wave generating unit 6, and a comparing unit 7.

The modulation-factor calculating unit 4 calculates a modulation factor (PMF) based on an intermediate direct-current voltage (EFC) and an output voltage command ($|V^*|$). The EFC is a voltage of direct-current power supplied from the direct-current power source 3 to the power conversion unit 2. The modulation-factor calculating unit 4 calculates the PMF according to the following formula:

$$PMF = 2 \cdot |V^*|/EFC \quad (1)$$

The carrier-wave generating unit 5 generates carrier waves ($Ca_u$, $Ca_v$, and $Ca_w$) of a U phase, a V phase, and a W phase based on an output voltage phase angle command ($\theta^*$) and the modulation factor (PMF) calculated by the modulation-factor calculating unit 4. Details of the internal configuration of the carrier-wave generating unit 5 and a carrier wave generating operation are explained below.

The modulation-wave generating unit 6 generates modulation waves ($\alpha_u$, $\alpha_v$, and $\alpha_w$) of the U phase, the V phase, and the W phase based on the output voltage phase angle command ($\theta^*$) and the modulation factor (PMF) calculated by the modulation-factor calculating unit 4. When $\theta^*$ corresponds to the U phase, the modulation-wave generating unit 6 generates modulation waves of the respective phases according to the following formula:

$$\alpha_u = PMF \cdot \sin(\theta)$$

$$\alpha_v = PMF \cdot \sin(\theta - 2\pi/3)$$

$$\alpha_w = PMF \cdot \sin(\theta - 4\pi/3) \quad (2)$$

The comparing unit 7 operating as a switching-signal generating unit compares, for each of in-phases, the modulation waves ($\alpha_u$, $\alpha_v$, and $\alpha_w$) generated by the modulation-wave generating unit 6 and the carrier waves ($Ca_u$, $Ca_v$, and $Ca_w$) generated by the carrier-wave generating unit 5 and generates switching signals ($SW_u$, $SW_v$, and $SW_w$), which are control signals for the power conversion unit 2, based on the comparison result. The power conversion control device in the present embodiment controls the power conversion unit 2 in a synchronous PWM mode in which a carrier wave and a modulation wave used for the generation of the switching signal are synchronized with each other.

Figure 2:
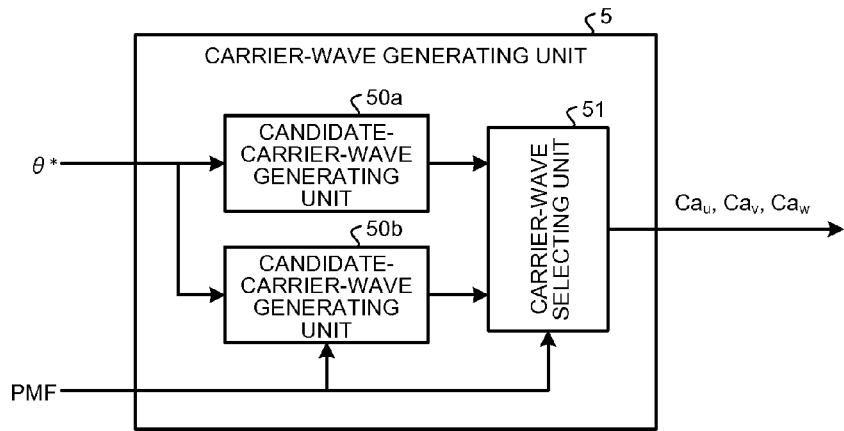
FIG. 2 is a diagram of a configuration example of a carrier-wave generating unit.

Details of the carrier-wave generating unit 5 are explained. FIG. 2 is a diagram of a configuration example of the carrier-wave generating unit 5. As shown in the figure, the carrier-wave generating unit 5 includes candidate-carrier-wave generating units 50a and 50b and a carrier-wave selecting unit 51. The candidate-carrier-wave generating unit 50a generates a first candidate carrier wave based on the output voltage phase angle command ($\theta^*$). The candidate-carrier-wave generating unit 50b generates a second candidate carrier wave based on the output voltage phase angle command ($\theta^*$) and the modulation factor (PMF) calculated by the modulation-factor calculating unit 4. Note that the candidate-carrier-wave generating units 50a and 50b respectively generate candidate carrier waves of the U phase, the V phase, and the W phase.

The carrier-wave selecting unit 51 selects, based on the modulation factor (PMF), the carrier waves (first candidate carrier waves of the U, V, and W phases) generated by the candidate-carrier-wave generating unit 50a or the carrier waves (second candidate carrier waves of the U, V, and W phases) generated by the candidate-carrier-wave generating unit 50b and outputs the carrier waves to the comparing unit 7 as the carrier waves $Ca_u$, $Ca_v$, and $Ca_w$ of the respective phases. In the case of an overmodulation state (in the case of PMF>1), the carrier-wave selecting unit 51 selects the carrier waves selected by the candidate-carrier-wave generating unit 50b. In the case of a non-overmodulation state, the carrier-wave selecting unit 51 selects the carrier waves generated by the candidate-carrier-wave generating unit 50a.

The carrier waves (the first candidate carrier waves) generated by the candidate-carrier-wave generating unit 50a and the carrier waves (the second candidate carrier waves) generated by the candidate-carrier-wave generating unit 50b are explained.

Figure 3:
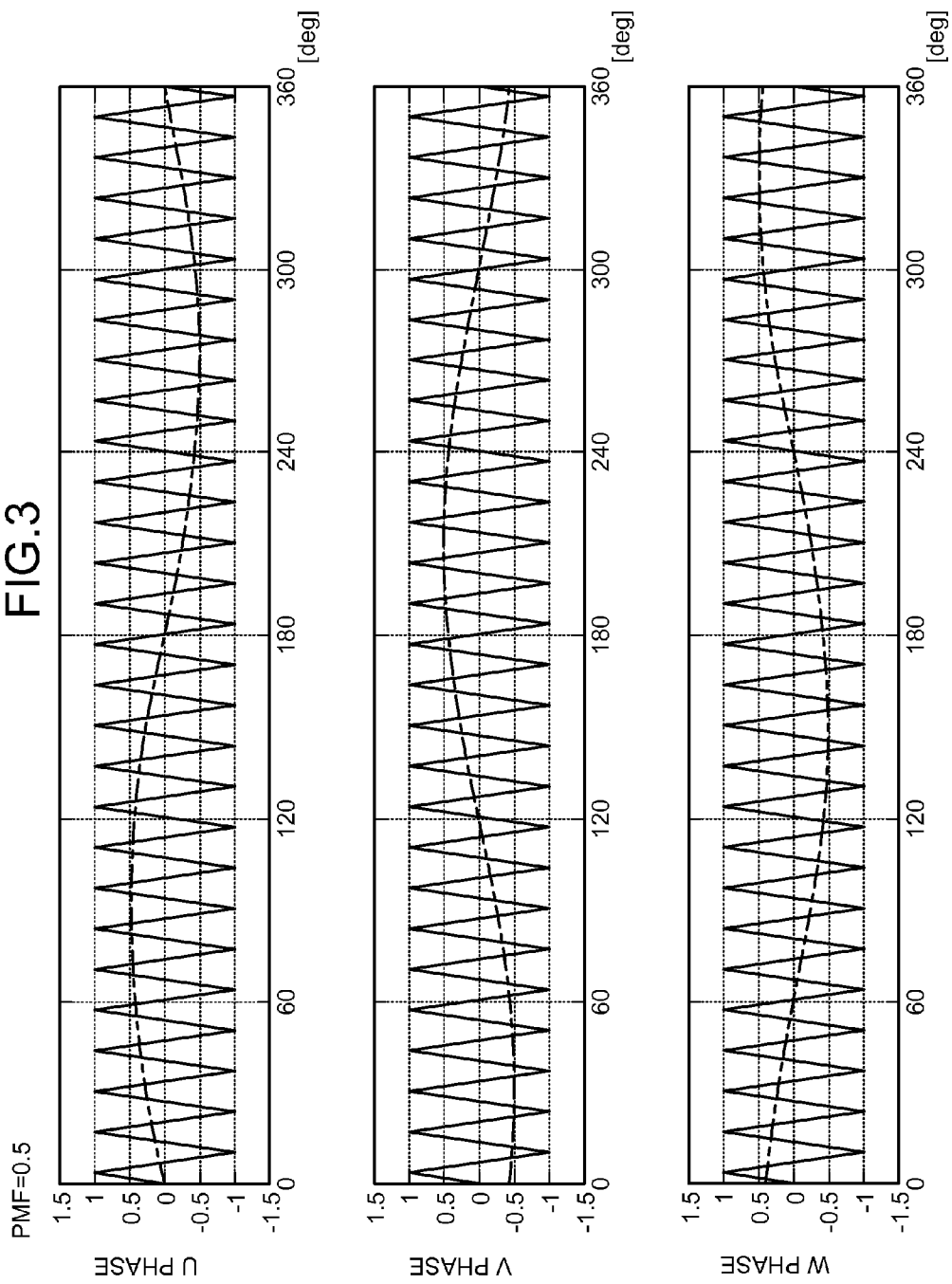
FIG. 3 is a diagram of an example of carrier waves generated by a candidate-carrier-wave generating unit.

FIG. 3 is a diagram of an example of the carrier waves generated by the candidate-carrier-wave generating unit 50a. The candidate-carrier-wave generating unit 50a generates, as the carrier waves, triangular waves shown in the figure. Note that, for convenience of explanation, modulation waves in the case of PMF=0.5 are also described. The modulation waves are indicated by chain lines. In FIG. 3, a phase angle of a U-phase modulation wave is shown on the abscissa. As shown in the figure, the candidate-carrier-wave generating unit 50a generates carrier waves same as carrier waves in the past (e.g., carrier waves shown in FIGS. 6 and 7 of Patent Literature 1). The candidate-carrier-wave generating unit 50a can generate saw-tooth waves rather than the triangular waves.

Figure 4:
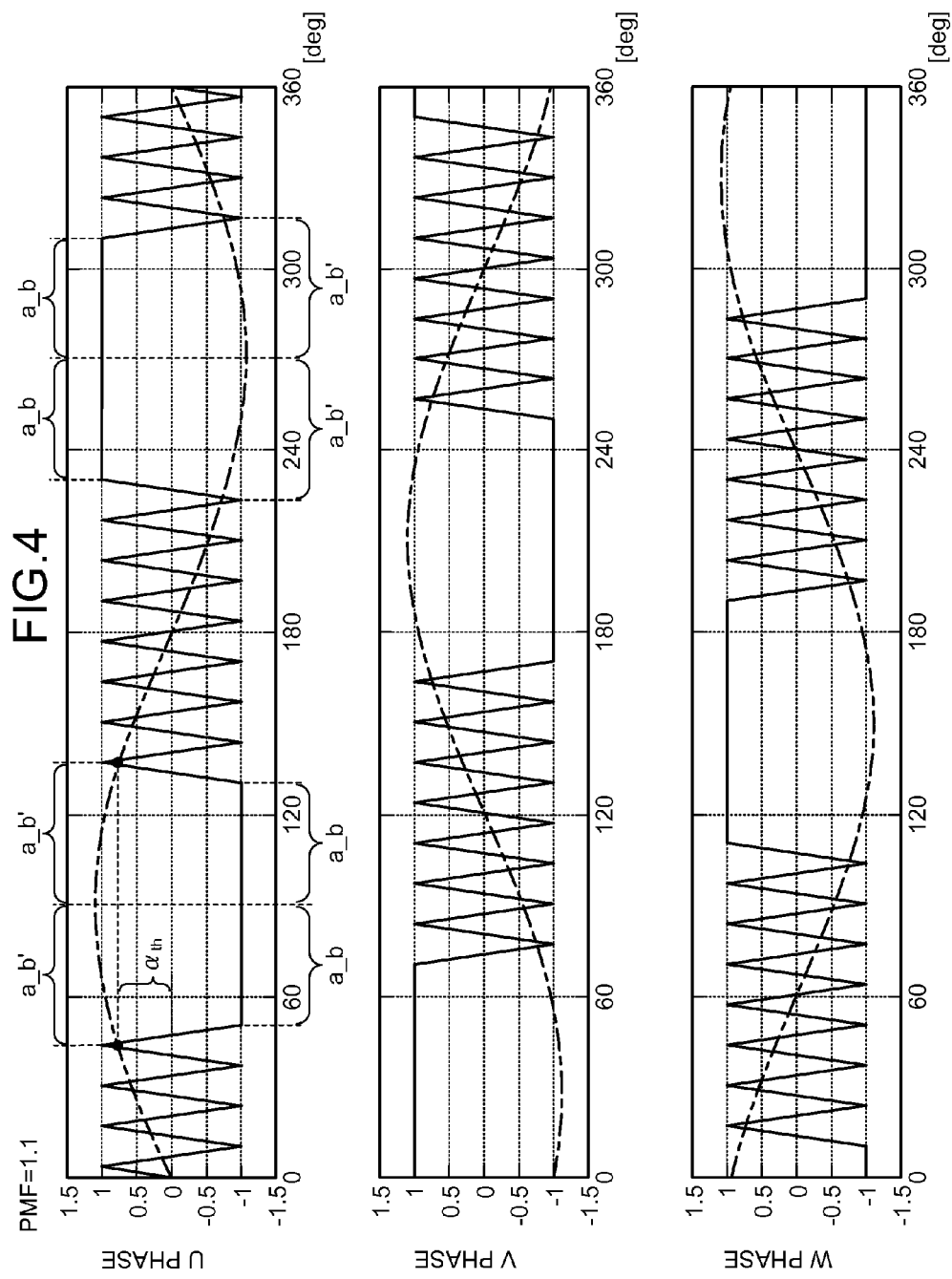
FIG. 4 is a diagram of an example of carrier waves generated by a candidate-carrier-wave generating unit.
Figure 5:
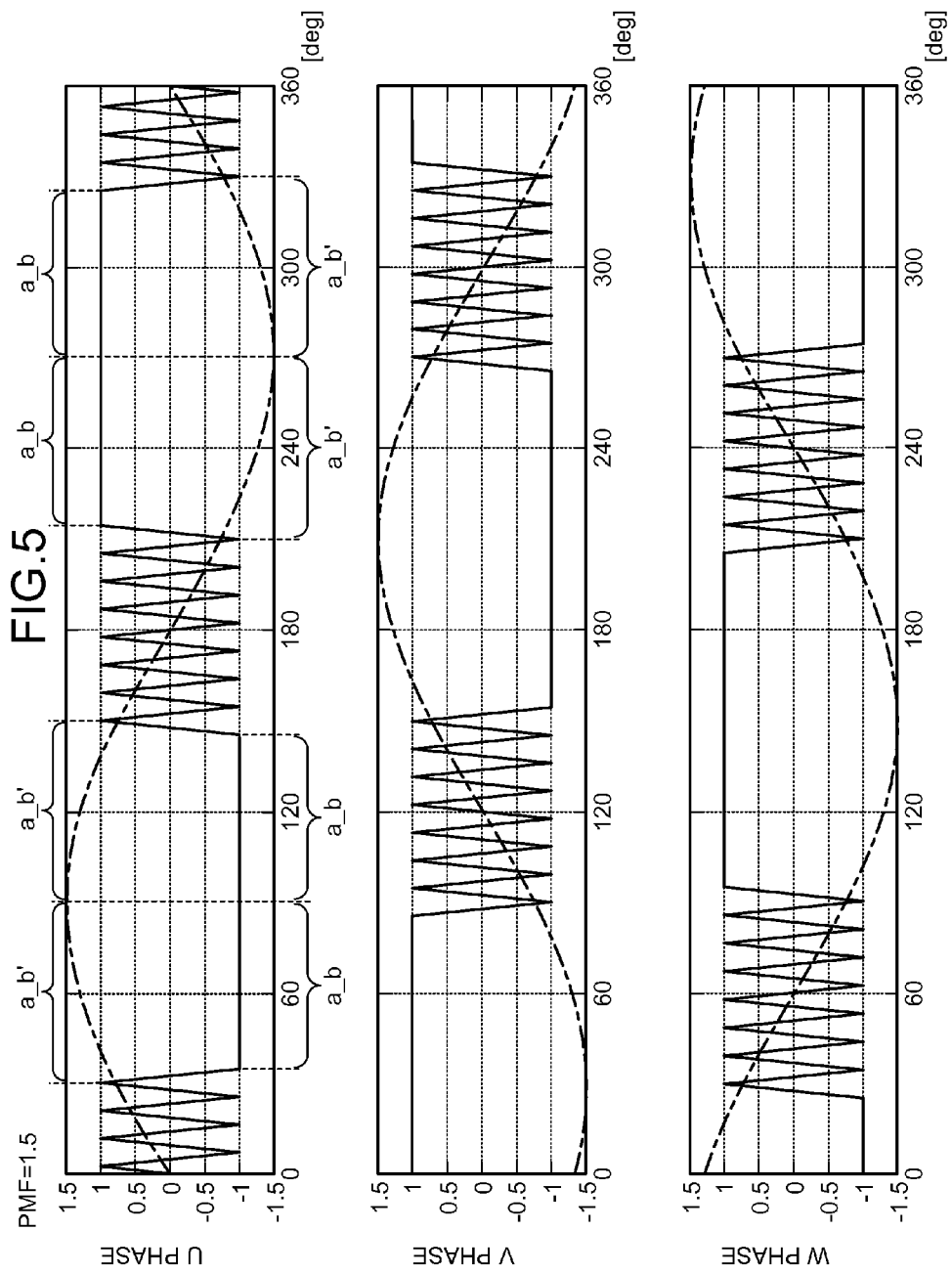
FIG. 5 is a diagram of an example of the carrier waves generated by the candidate-carrier-wave generating unit.

FIG. 4 and FIG. 5 are diagrams of examples of the carrier waves generated by the candidate-carrier-wave generating unit 50b. FIG. 4 shows an example of carrier waves generated in the case of PMF=1.1. FIG. 5 shows an example of carrier waves generated in the case of PMF=1.5. As shown in FIG. 4 and FIG. 5, the candidate-carrier-wave generating unit 50b generates, as the carrier waves of the U, V, and W phases, signals that have a value fixed to −1 (or fixed to +1) in fixed sections (two a_b sections) centering on a peak position of modulation waves corresponding to the carrier waves (or positions shifted by a half cycle from the peak position) and are triangular waves same as the carrier waves in the past in other sections. For example, the carrier wave of the U phase is fixed to −1 in a section of 90±a_b [deg] and fixed to +1 in a section of 270±a_b [deg]. The carrier waves may be saw-tooth waves instead of the triangular waves. The a_b sections are shown only for the carrier wave in the U phase. However, in the V phase and the W phase, values are fixed to +1 or −1 in the same sections. The sections where the values are fixed fluctuate according to the modulation factor PMF. The carrier waves of the respective phases are set such that the triangular waves and the fixed waves (the signals fixed to +1 or −1) continuously connected. To put it differently, the carrier waves generated by the candidate-carrier-wave generating unit 50b can be considered as signals that are fixed to +1 or −1 in sections where the magnitudes (absolute values) of the modulation waves are larger than a predetermined threshold (a value smaller than the amplitude of the triangular waves; equivalent to $\alpha_{th}$ shown in FIG. 4) and are triangular waves in other sections.

Figure 6:
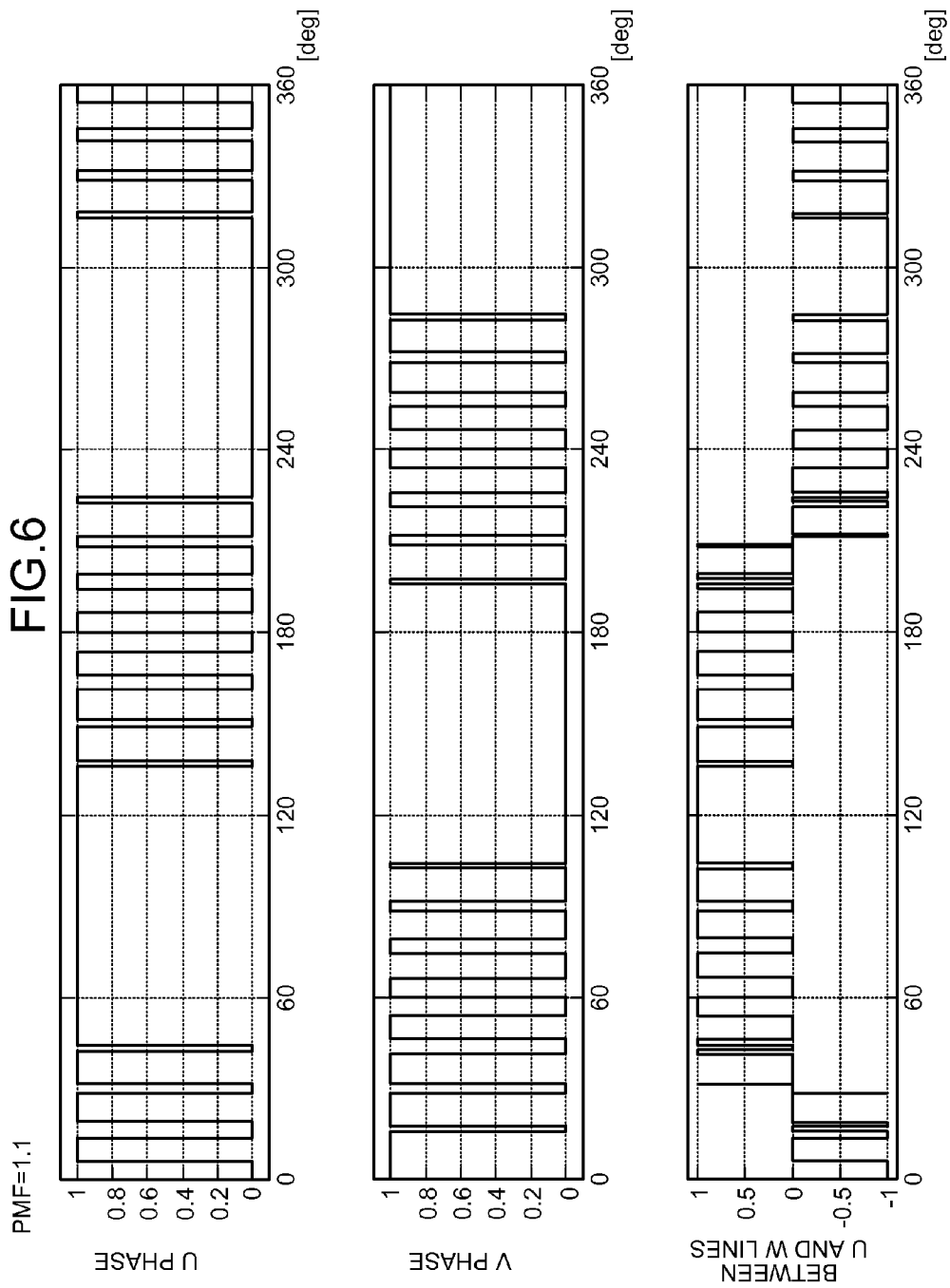
FIG. 6 is a diagram of an example of switching signals generated using the carrier waves shown in FIG. 4.
Figure 7:
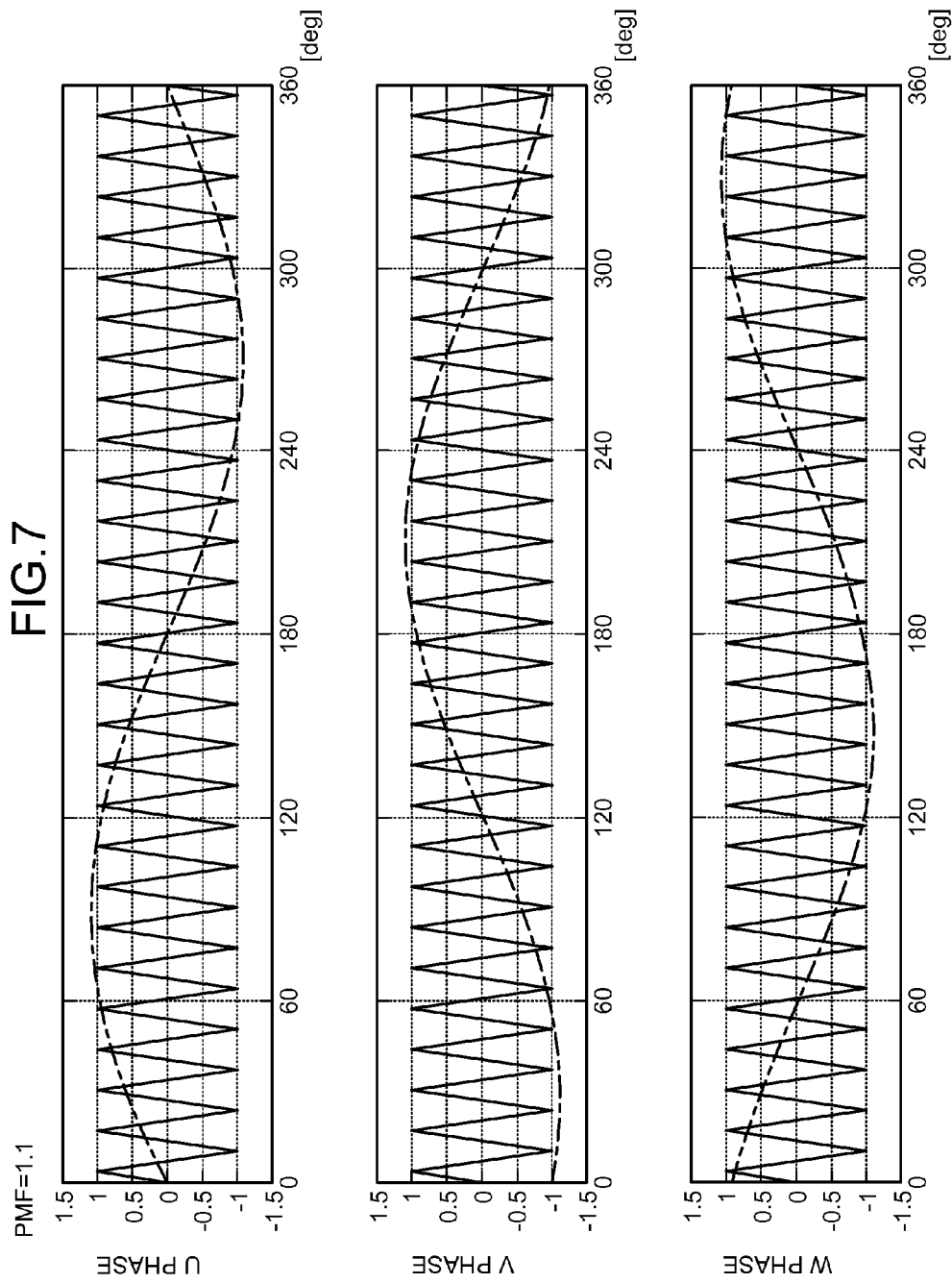
FIG. 7 is a diagram of an example of carrier waves generated by a power conversion control device in the past.

FIG. 6 is a diagram of an example of switching signals (switching patterns) generated by the comparing unit 7 in the case of PMF=1.1, that is, when the carrier waves shown in FIG. 4 are used. FIG. 7 is a diagram of an example of carrier waves generated by a power conversion control device in the past. Modulation waves in the case of PMF=1.1 are also described. As shown in the figure, in the overmodulation state, the power conversion control device in the past generates carrier waves same as carrier waves generated in a non-overmodulation state (a state of PMF≤1.0). When the carrier waves in the past shown in FIG. 7 are used, if PMF=1.1, switching patterns shown in FIG. 8 are obtained.

Figure 8:
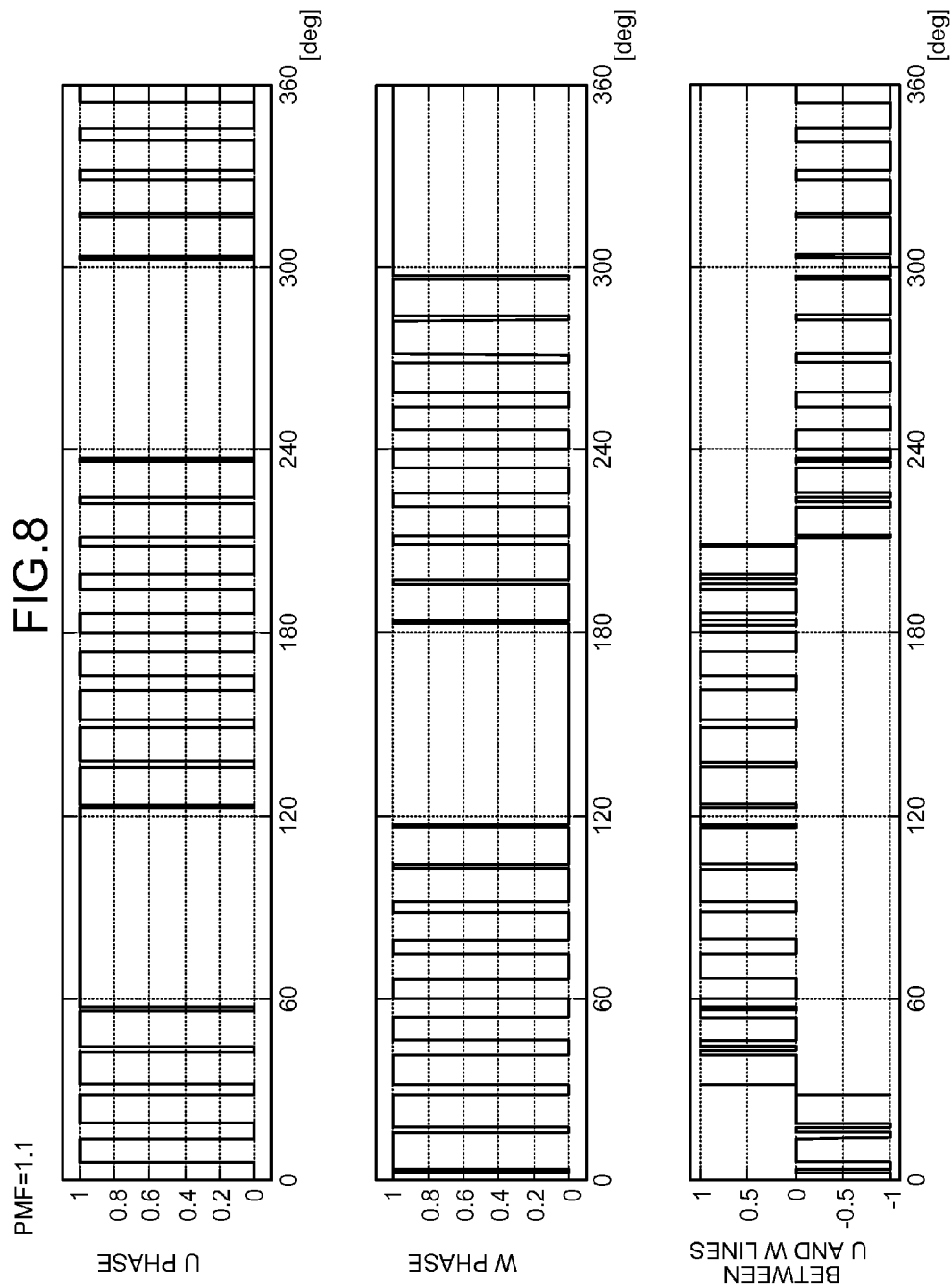
FIG. 8 is a diagram of an example of switching signals generated using the carrier waves in the past.

When FIG. 6 showing the switching patterns by the power conversion control device in the present embodiment and FIG. 8 showing the switching patterns in the past are compared, it is seen that the number of times of switching is smaller when the control by the power conversion control device in the present embodiment is applied than in the past. For example, concerning the U phase, in FIG. 6, switching near 60 degrees (deg), near 120 degrees, near 240 degrees, and near 300 degrees, which occurs in FIG. 8, is avoided.

As explained above, the power conversion control device in the present embodiment is configured such that the candidate-carrier-wave generating unit 50b generates the carrier waves explained above and, during the overmodulation, the comparing unit 7 generates the switching signals using the carrier waves. Therefore, in a power conversion control operation during the overmodulation, a narrow pulse is not included in the switching signals. It is possible to suppress the number of times of switching. The influence of the narrow pulse on the modulation accuracy is small. Therefore, by avoiding generation of the narrow pulse, it is possible to reduce a switching loss while preventing the modulation accuracy from being degraded. Note that the modulation accuracy is information indicating an error between a voltage (an indicated voltage) indicated by an output voltage command and an actually output voltage. Because synchronous PWM control (control in a synchronous PWM mode) is performed, it is possible to prevent the numbers of times of switching of three phases from becoming unbalanced near a boundary between a non-crossing section where a carrier wave and a modulation wave do not cross each other during the overmodulation and a crossing occurrence section where the crossing occurs. It is possible to prevent pulsation of a load current (a beat phenomenon) from occurring. That is, it is possible to stabilize the number of generated pulses and prevent occurrence of imbalance of the numbers of times of switching without performing difficult control for solving the problem in that the number of generated pulses becomes unstable, which needs to be performed in the power conversion control in the past that performs a control in the asynchronous PWM mode during the overmodulation.

The carrier waves generated by the candidate-carrier-wave generating unit 50b are explained more in detail. The carrier wave of the U phase is explained with reference to FIG. 4. The carrier waves of the V phase and the W phase are different from the carrier wave of the U phase only in a phase and are the same as the carrier wave of the U phase in a waveform. Therefore, explanation of the carrier waves of the V phase and the W phase is omitted.

Compared with the carrier wave that is generated by the candidate-carrier-wave generating unit 50a and is the same as the carrier waves in the past, the carrier wave generated by the candidate-carrier-wave generating unit 50b is fixed to +1 or −1 so that a switching operation does not occur in a section represented by Formula (3a) and Formula (3b) below.

$$\pi/2 - a\_b < \theta < \pi/2 + a\_b \quad (3a)$$

$$3\pi/2 - a\_b < \theta < 3\pi/2 + a\_b \quad (3b)$$

The carrier wave is fixed to +1 in the section of Formula (3a) and fixed to −1 in the section of Formula (3b). Note that the section width a_b used in Formulas (3a) and (3b) is determined as explained below with attention directed to $\theta < \pi/2$. An angle width equivalent to a carrier wave half cycle is represented as X. X satisfies the following Formula (4):

$$a\_b' = a\_b + X \quad (4)$$

To determine a switching timing condition $\theta = \pi/2 - a\_b'$ closest to $\pi/2$ in the section of $0 < \theta < \pi/2$, a threshold $\alpha_{th}$ is given as a condition for the magnitude of the U-phase modulation wave at this timing and is defined as Formula (5). In the formula, $\alpha_{th}$ relates to an allowable minimum pulse width and is set, for example, between 0.5 and 1.0.

$$|PMF \sin(\pi/2 - a\_b')| = \alpha_{th} \quad (5)$$

Formula (5) can be transformed into the following Formula (6):

$$a\_b' = -\sin^{-1}\left(\frac{\alpha_{th}}{PMF}\right) + \frac{\pi}{2} \quad (6)$$

Figure 9:
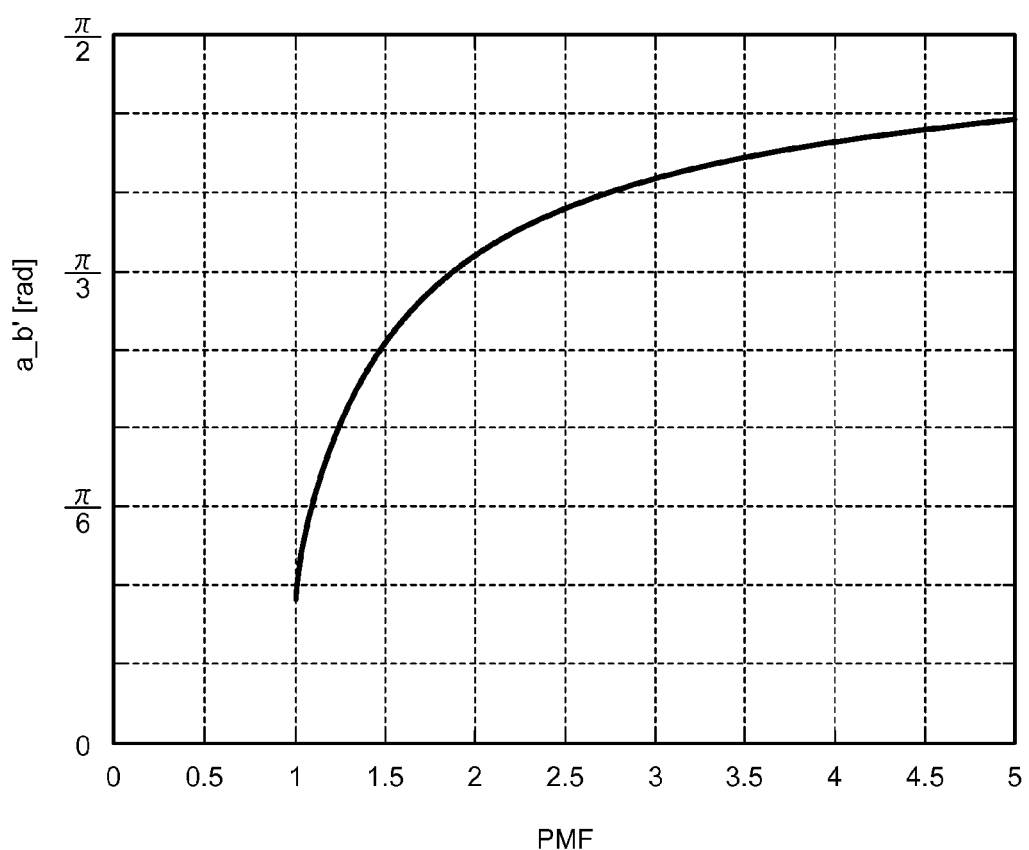
FIG. 9 is a diagram of an example of a relation between a modulation factor and a switching stop section.

When $\alpha_{th}=0.95$ is set in Formula (6), the characteristic of a_b' with respect to the modulation factor PMF is as shown in FIG. 9. FIG. 9 indicates that, as the modulation factor PMF is larger, a section where a modulation wave exceeds 1 increases and the width (a_b×2) of a section where switching is stopped (a carrier wave is fixed to +1 or −1) and a_b' obtained by adding a half cycle of the carrier wave to a_b expand.

As explained above, the candidate-carrier-wave generating unit 50b sets, according to the characteristic curve shown in FIG. 9, the switching stop sections (a_b and a_b') corresponding to the modulation factor PMF and generates carrier waves having the waveforms shown in FIG. 4 and FIG. 5.

Note that the configuration of the carrier-wave generating unit 5 is not limited to the configuration shown in FIG. 2. The candidate-carrier-wave generating unit 50b may generate, when the modulation factor PMF is equal to or smaller than 1, carrier waves same as the carrier waves in the past and generate, when the modulation factor PMF exceeds 1, carrier waves having a fixed value (+1 or −1) in a section corresponding to a value of PMF and output the carrier waves to the comparing unit 7.

As explained above, the power conversion control device in the present embodiment uses the synchronous PWM control for controlling the power conversion device in the synchronous PWM mode. The power conversion control device includes the carrier-wave generating unit that outputs, in the case of the overmodulation state, a fixed value (−1 or +1) in first sections (the non-crossing sections explained above and near the non-crossing sections) centering on a peak position of a modulation signal and a position shifted by a half cycle from the peak position and having a length corresponding to a modulation factor and that outputs triangular waves in the remaining second sections. The power conversion control device generates, using the carrier waves generated by the carrier-wave generating unit, PWM control signals (switching signals) for controlling a power conversion circuit. Accordingly, it is possible to prevent a narrow pulse from being included in the PWM control signals; therefore, it is possible to suppress the number of times of switching and reduce a switching loss. In addition, it is possible to prevent the numbers of times of switching of the three phases from becoming unbalanced. It is possible to prevent unnecessary pulsation from occurring in a load current.

The first sections are determined using the modulation factor and the magnitude of the modulation waves (equivalent to $\alpha_{th}$ explained above). Therefore, it is possible to quantitatively set a suppressing effect for the numbers of times of switching.

The first sections are set such that the carrier waves in the sections and the carrier waves in the second sections are continuously connected, that is, the continuity of the carrier waves is maintained in boundary portions between the first sections and the second sections. Therefore, it is possible to surely avoid occurrence of unnecessary switching.

Further, a voltage input to an electric motor can be set higher by applying the power conversion control device in the present embodiment. Therefore, an input current can be suppressed and thus a Joule loss (mainly, a copper loss) due to an electric current decreases. That is, a loss of the electric motor decreases and thus the cooling performance can be suppressed. Therefore, it is possible to reduce the size and the weight of the electric motor by reviewing a cooling fin shape and a cooling air passage.

Note that, in order to maintain the continuity of the carrier waves, the carrier waves in sections of the second sections other than the boundary portions between the second sections and the first sections are also generated in synchronization with the modulation waves. This is more preferable because it is possible to easily realize the configuration of the carrier-wave generating unit.

Note that, in the above explanation, the power conversion device that converts direct-current power into three-phase alternating-current power is controlled. However, the power conversion control device can also be applied to control of a power conversion device that converts the direct-current power into single-phase alternating-current power and a switching loss can be reduced.

Second Embodiment

In the present embodiment, a vehicle driving system applied with the power conversion control device explained in the first embodiment is explained.

Figure 10:
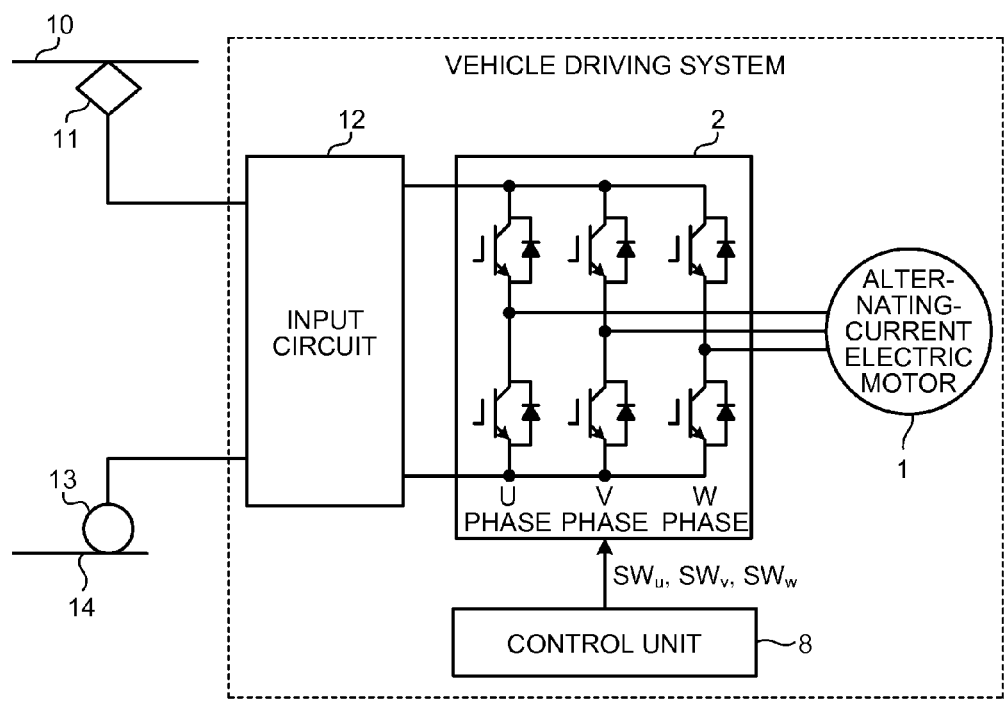
FIG. 10 is a diagram of a configuration example of a vehicle driving system.

FIG. 10 is a diagram of a configuration example in which the power conversion control device is applied to a railway vehicle as a vehicle driving system. The vehicle driving system includes the alternating-current electric motor 1, the power conversion unit 2, a control unit 8, and an input circuit 12. The alternating-current electric motor 1 is the same as the alternating-current electric motor 1 shown in FIG. 1 and is mounted on the railway vehicle. The power conversion unit 2 is the same as the power conversion unit 2 shown in FIG. 1. The power conversion unit 2 converts the direct-current power supplied from the input circuit 12 into alternating-current power and drives the alternating-current electric motor 1. The control unit 8 is equivalent to the power conversion control device explained in the first embodiment. That is, the control unit 8 is configured to include the modulation-factor calculating unit 4, the carrier-wave generating unit 5, the modulation-wave generating unit 6, and the comparing unit 7 explained in the first embodiment. The control unit 8 generates the switching signals (SWu, SWv, and SWw) for controlling the power conversion unit 2.

Although not shown in the figure, the input circuit 12 is configured to include a switch, a filter capacitor, a filter reactor, and the like. One end of the input circuit 12 is connected to an overhead line 10 via a current collector 11. The other end of the input circuit 12 is connected to a rail 14, which is ground potential, via a wheel 13. The input circuit 12 receives supply of the direct-current power or alternating-current power from the overhead line 10 and generates direct-current power supplied to the power conversion unit 2.

By applying the power conversion control device in the present embodiment to the vehicle driving system in this way, it is possible to realize a reduction in a loss and a reduction in the size of the entire system.

INDUSTRIAL APPLICABILITY

As explained above, the present invention is useful as the power conversion control device that performs control capable of reducing a switching loss during power conversion.

REFERENCE SIGNS LIST 1 alternating-current electric motor
2 power conversion unit
3 direct-current power source
4 modulation-factor calculating unit
5 carrier-wave generating unit
6 modulation-wave generating unit
7 comparing unit
50a, 50b candidate-carrier-wave generating unit
51 carrier-wave selecting unit
8 control unit
10 overhead line
11 current collector
12 input circuit
13 wheel
14 rail

The invention claimed is:

1. A power conversion control device that controls, based on a modulation wave and a carrier wave, a power conversion device that converts direct-current power into alternating-current power, the power conversion control device comprising:
   a modulation-wave generating unit that generates a modulation wave based on an output voltage phase angle command and a modulation factor, the modulation factor being calculated based on an output voltage command, and a direct-current voltage supplied to the power conversion device;
   a carrier-wave generating unit that, in a case of a non-overmodulation state, generates a triangular wave or a saw-tooth wave as the carrier wave, and, in a case of an overmodulation state, generates, as the carrier wave, a signal fixed to −1 in a first section that is a predetermined range centering on a timing corresponding to a peak position of the modulation wave, generates, as the carrier wave, a signal fixed to +1 in a second section obtained by shifting the first section by a half cycle of the modulation wave, and generates, as the carrier wave, a triangular wave or a saw-tooth wave in a remaining third section; and
   a switching-signal generating unit that compares the carrier wave and the modulation wave and generates a switching signal for controlling the power conversion device.

2. The power conversion control device according to claim 1, wherein the carrier-wave generating unit generates a carrier wave synchronizing with a modulation wave.

3. The power conversion control device according to claim 1, wherein
   the carrier-wave generating unit includes
      a first candidate-carrier-wave generating unit that generates, based on an output voltage phase angle command, a carrier wave used in a case of a non-overmodulation state as a first candidate carrier wave, a second candidate-carrier-wave generating unit that generates, based on an output voltage phase angle command and a modulation factor, a carrier wave used in a case of an overmodulation state as a second candidate carrier wave, and a carrier-wave selecting unit that selects the first candidate carrier wave and outputs the first candidate carrier wave as the carrier wave in a case of a non-overmodulation state and selects the second candidate carrier wave and outputs the second candidate carrier wave as the carrier wave in a case of an overmodulation state.

4. The power conversion control device according to claim 1, wherein the carrier-wave generating unit sets the first section based on a modulation factor.

5. The power conversion control device according to claim 1, wherein the carrier-wave generating unit generates a carrier wave in which a continuity is maintained in a boundary between the first section or the second section and the third section.

6. A vehicle driving system comprising:
   the power conversion control device according to claim 1;
   a power conversion device controlled by the power conversion control device;
   an input circuit that generated direct-current power input to the power conversion device; and
   an electric motor driven by the power conversion device.

7. A power conversion control method in controlling, based on a modulation wave and a carrier wave, a power conversion device that converts direct-current power into alternating-current power, the power conversion control method comprising:
   a modulation-wave generating step of generating a modulation wave based on an output voltage phase angle command, and a modulation factor, the modulation factor being calculated based on an output voltage command and a direct-current voltage supplied to the power conversion device;
   a carrier-wave generating step of, in a case of a non-overmodulation state, generating a triangular wave or a saw-tooth wave as the carrier wave, and, in a case of an overmodulation state, generating, as the carrier wave, a signal fixed to −1 in a first section that is a predetermined range centering on a timing corresponding to a peak position of the modulation wave, generating, as the carrier wave, a signal fixed to +1 in a second section obtained by shifting the first section by a half cycle of the modulation wave, and generating, as the carrier wave, a triangular wave or a saw-tooth wave in a remaining third section; and a switching-signal generating step of comparing the carrier wave and the modulation wave and generating a switching signal for controlling the power conversion device.

8. A power conversion control device that controls, based on a modulation wave and a carrier wave, a power conversion device that converts direct-current power into alternating-current power, the power conversion control device comprising:
   a modulation-wave generating unit that generates a modulation wave based on a a modulation factor calculated based on an output voltage command and a direct-current voltage supplied to the power conversion device;
   a carrier-wave generating unit that generates, as the carrier wave, a signal having a first portion that is maintained at an amplitude which is smaller than the modulation wave in a continuous section where the amplitude of the modulation wave is greater than a predetermined threshold value that is less than a peak value of the carrier wave; and
   a switching-signal generating unit that compares the carrier wave and the modulation wave and generates a switching signal for controlling the power conversion device.

9. The power conversion control device according to claim 8, wherein the signal also has a second portion that comprises an oscillating signal.

10. A power conversion control device that controls, based on a modulation wave and carrier wave, a power conversion device that converts direct-current power into alternating-current power, the power conversion control device comprising:
    a modulation-wave generating unit that generates a modulation wave based on a modulation factor calculated based on an output voltage command and a direct-current voltage supplied to the power conversion device;
    a carrier-wave generating unit that generates, as the carrier wave, a signal having a first portion that is maintained at an amplitude which is larger than the modulation wave in a continuous section where the amplitude of the modulation wave is less than a predetermined threshold value that is more than a minimum value of the carrier wave; and
    a switching-signal generating unit that compares the carrier wave and the modulation wave and generates a switching signal for controlling the power conversion device.

11. The power conversion control device according to claim 10, wherein the signal also has a second portion that comprises an oscillating signal.

* * * * *